United States Patent
Kobayashi

(10) Patent No.: US 11,908,144 B2
(45) Date of Patent: Feb. 20, 2024

(54) IMAGE PROCESSING APPARATUS, METHOD, AND MEDIUM USING DEGREES OF RELIABILITY AND SIMILARITY IN MOTION VECTORS

(71) Applicant: CANON KABUSHIKI KAISHA, Tokyo (JP)

(72) Inventor: Masaaki Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 69 days.

(21) Appl. No.: 17/519,371

(22) Filed: Nov. 4, 2021

(65) Prior Publication Data

US 2022/0148198 A1    May 12, 2022

(30) Foreign Application Priority Data

Nov. 9, 2020    (JP) ................. 2020-186713

(51) Int. Cl.
| | |
|---|---|
| *G06T 7/223* | (2017.01) |
| *H04N 21/2187* | (2011.01) |
| *H04N 21/233* | (2011.01) |
| *H04N 21/234* | (2011.01) |
| *H04N 21/258* | (2011.01) |

(52) U.S. Cl.
CPC ......... *G06T 7/223* (2017.01); *H04N 21/2187* (2013.01); *H04N 21/233* (2013.01); *H04N 21/23412* (2013.01); *H04N 21/25891* (2013.01)

(58) Field of Classification Search
CPC ........... G06T 7/223; G06T 2207/20021; G06T 7/246; G06T 7/215; H04N 21/2187; H04N 21/233; H04N 21/23412; H04N 21/25891; H04N 23/683; H04N 19/521; H04N 23/6811
USPC ........................................... 382/107
See application file for complete search history.

(56) References Cited

U.S. PATENT DOCUMENTS

2018/0103829 A1*    4/2018  Kuriyama .......... G02B 23/2484

FOREIGN PATENT DOCUMENTS

| JP | 2004246667 A | 9/2004 |
|---|---|---|
| JP | 2007334625 A | 12/2007 |
| JP | 2010109876 A | 5/2010 |
| JP | 2014229030 A | 12/2014 |

OTHER PUBLICATIONS

Dario A. Bini, et al.; "Algorithms for the matrix pth root;" Numerical Algorithms (2005) 39: 349-378.

(Continued)

*Primary Examiner* — Stephen P Coleman
(74) *Attorney, Agent, or Firm* — Canon U.S.A., Inc. IP Division

(57) ABSTRACT

A plurality of motion vectors are acquired from consecutive images. From the acquired plurality of motion vectors, a motion vector of interest and neighboring motion vectors neighboring the motion vector of interest are selected and a degree of similarity between two motion vectors is acquired. A value related to the total number of neighboring motion vectors having high degrees of similarity to the motion vector of interest is acquired as a degree of reliability.

11 Claims, 10 Drawing Sheets

(56) References Cited

OTHER PUBLICATIONS

Toru Tamaki; "Pose Estimation and Rotation Matrices;" The Institute of Electronics, Information and Communication Engineers; IEICE Technical Report; SIP2009-48, SIS2009-23(Sep. 2009); pp. 59-64.
Martin A. Fischler et al.; "Random Sample Consensus: A Paradigm for Model Fitting with Applications to Image Analysis and Automated Cartography;" Communications of the ACM; Jun. 1981, vol. 24, No. 6; pp. 381-395.

* cited by examiner

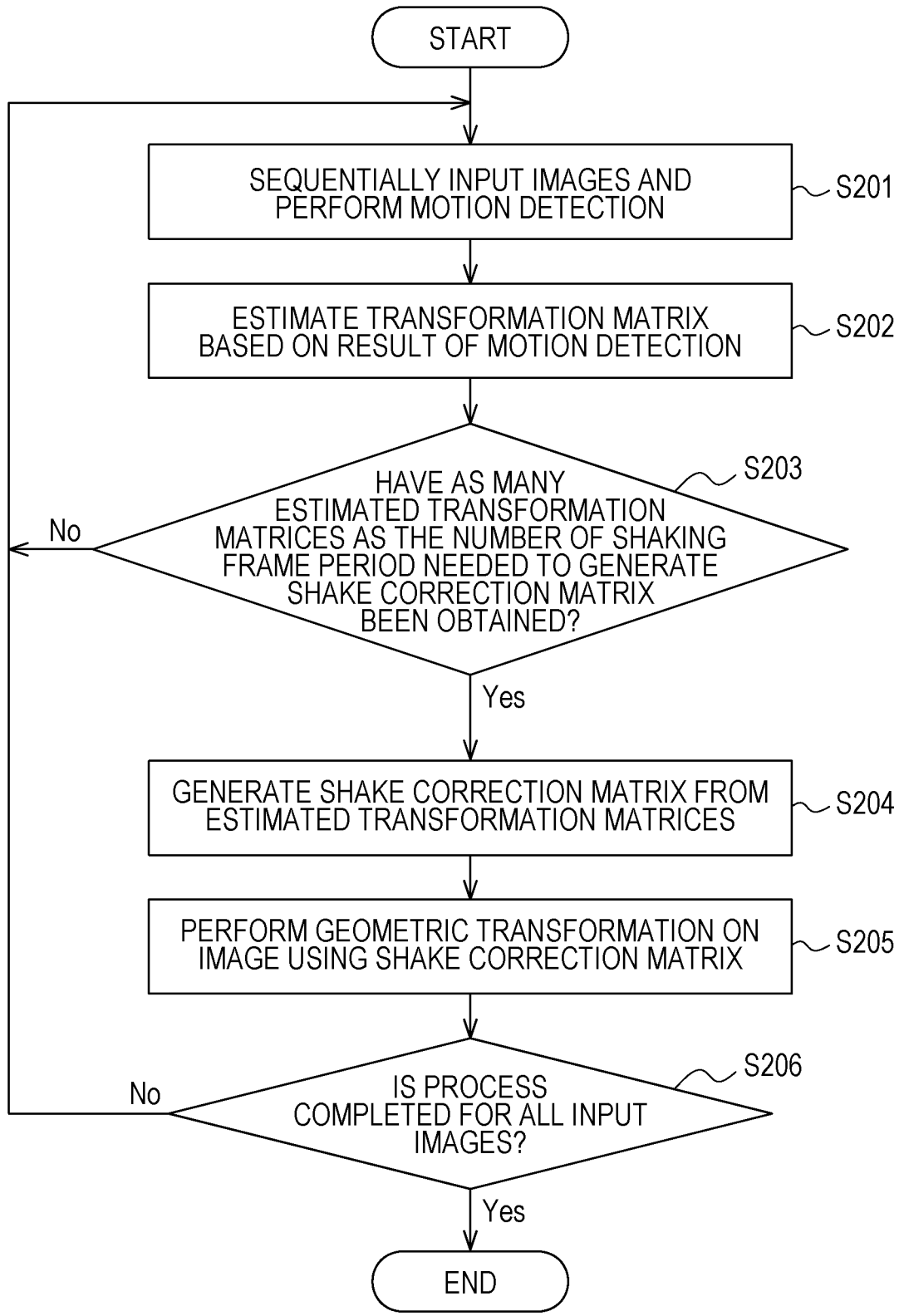

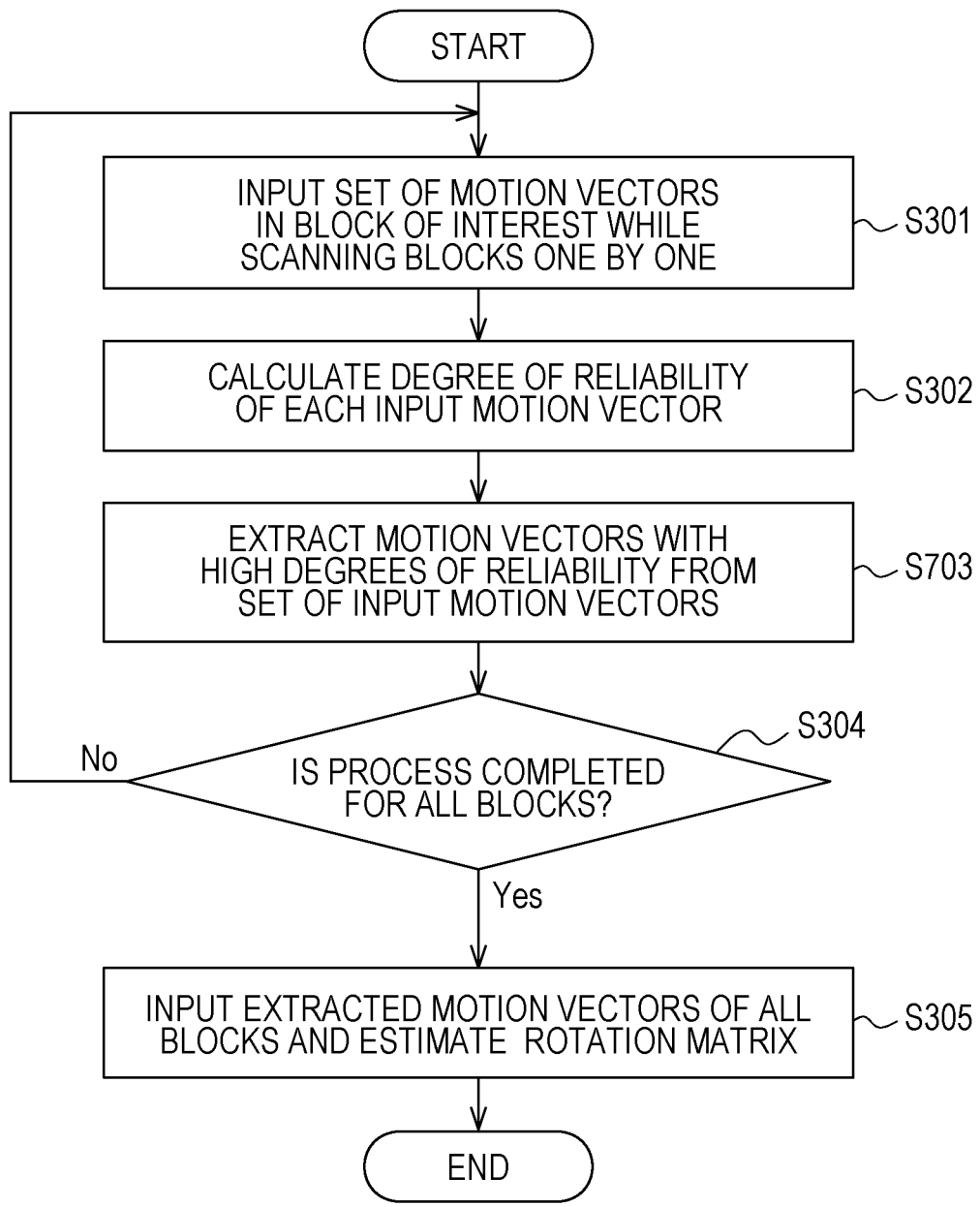

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |

IMAGE PROCESSING APPARATUS, METHOD, AND MEDIUM USING DEGREES OF RELIABILITY AND SIMILARITY IN MOTION VECTORS

BACKGROUND

Technical Field

The present disclosure relates to an image processing technique for acquiring a motion vector from an image.

Description of the Related Art

The improvement of the computing performance of computers has resulted in an increase in practicality of image processing technology in the field called computer vision, such as image area division, image alignment, and the like.

In image alignment, a plurality of motion vectors are calculated from temporally consecutive images, and motion parameters representing positional deviations between images are calculated based on the motion vectors. For example, a motion vector is calculated as follows. A first image in the temporally consecutive images and a second image in the temporally consecutive images are selected, and searching is performed to detect an image area of the second image having a highest degree of similarity to an image area (a feature point) of the first image, a relative position between the detected image areas of two images is employed as a motion vector. An example of a search method based on the degree of similarity is to perform the search using block matching, in which SAD (Sum of Absolute Difference), SSD (Sum of Squared Difference), or the like is used to represent the similarity of images. The degree of reliability of a motion vector is determined such that the higher the degree of similarity of the images (the smaller the SAD values), the higher the degree of reliability of the motion vector based on the degrees of similarity. Japanese Patent Laid-Open No. 2007-334625 discloses a method in which feature points and feature values thereof are calculated, a feature value having highest degrees of similarity for an image of interest are paired, and a motion vector is given by a positional relationship between the feature points.

The degree of similarity used in calculating the motion vector tends to be calculated as being high for a monotonous area of an image compared with an area with a large variety of features. Therefore, in the method in which the degrees of reliability of motion vectors are regarded as high when the degree of similarity among motion vectors is high, the degree of reliability of motion vectors tends to be calculated as high for a monotonous area of an image where there are not a large variety of features. However, the degree of reliability determined in such a manner is not always high in precision and accuracy.

Motion vector can be acquired, for example, via a process in which feature points are extracted from images, feature values of the extracted feature points are calculated, feature values having highest degrees of similarity are paired, a motion vector is acquired based on a positional relationship between feature points whose feature values are paired. However, there is a possibility that feature points are concentrated in a specific area of an image. To handle this situation, the present embodiment uses, for example, a method in which each image is divided into blocks with the same size, and the number of feature points to be detected in each block is defined thereby allowing it detect feature points evenly from the entire image (see Japanese Patent Laid-Open No. 2014-229030). Motion parameters representing a motion of an image can be given by, for example, a two-dimensional vector, a homography matrix, or the like in addition to the rotation matrix. The form of the matrix is not limited, and other matrices such as an affine transformation matrix, a homography matrix, or the like may be used. Motion parameters representing a motion of an image can also be expressed a two-dimensional vector, a homography matrix, or the like. For further reference, see, for example, "Pose Estimation and Rotation Matrices", Toru Tamaki, IEICE Technical Report SIP2009-48, SIS2009-23 (2009 September) (Reference 1).

Note that there is a possibility that the detected motion vectors include an incorrect motion vector. To handle this situation, a robust estimation process may be performed to estimate a model from data including errors. A typical algorithm for robust estimation is RANSAC (see, for example, "Random sample consensus: A paradigm for model fitting with applications to image analysis and automated cartography", MA Fischler and RC Bolles, Communications of the ACM, 24 (6): 381-395, 1981, Reference 2). RANSAC is a technique for estimating an optimum model by repeating calculations. In the RANSAC process, as the number of data outliers for a model increases or as the number of elements of model parameters to be estimated increases, the number of iterations to be performed increases. To handle this situation, a robust estimation may be performed after motion vectors with low degrees of reliability (estimated to have low precision and accuracy) are removed thereby reducing the relative number of outliers and thus reducing the number of iterations to be performed.

In an image shake correction such as an electronic shake correction, an inverse matrix of a matrix that represents a motion between two images is determined for a plurality temporally consecutive images, a matrix is generated by smoothing a plurality of inverse matrices, and the images are subjected to a geometric transformation using the smoothed matrix thereby correcting the motion shake. Smoothing of matrices can be achieved by calculating a geometric moving average of the matrices, and radical roots of matrices used in the calculation of the geometric average can be calculated using a method described, for example, in Reference 3. (References 3: "Algorithms for the matrix pth root", "Dario A. Binia, Nicholas J. Highamb, and Beatrice Meinia", Numerical Algorithms (2005)39: 349-378.) The image alignment technique can be applied to various techniques such as a free viewpoint generation technique, an image composition, and the like, in addition to the image shake correction such as the electronic shake correction according to the present embodiment. An example of an image shake correction technique is disclosed in Japanese Patent Laid-Open No. 2010-109876, and an example of a free viewpoint generation technique is disclosed in Japanese Patent Laid-Open No. 2004-246667.

SUMMARY

In view of the above, the present disclosure provides a technique of acquiring a high degree of reliability of a motion vector which is high in precision and accuracy.

In an aspect, an image processing apparatus includes a vector acquisition unit, a selection unit, a similarity acquisition unit, and a reliability acquisition unit. The vector acquisition unit is configured to acquire a plurality of motion vectors based on consecutive images. The selection unit is configured to select a motion vector of interest and a plurality of neighboring motion vectors neighboring the motion vector of interest from the acquired plurality of motion vectors. The similarity acquisition unit is configured to acquire a degree of similarity between two motion vectors. The reliability acquisition unit is configured to acquire a degree of reliability represented by a value related to a total number of neighboring motion vectors having high degrees of similarity to the motion vector of interest.

Further features of the disclosure will become apparent from the following description of exemplary embodiments with reference to the attached drawings.

BRIEF DESCRIPTION OF THE DRAWINGS

FIG. 2 is a flowchart of an electronic shake correction process based on a motion detection.

FIG. 3 is a flowchart of a process of estimating a transformation matrix according to a first embodiment.

DESCRIPTION OF THE EMBODIMENTS

Figure 1A:
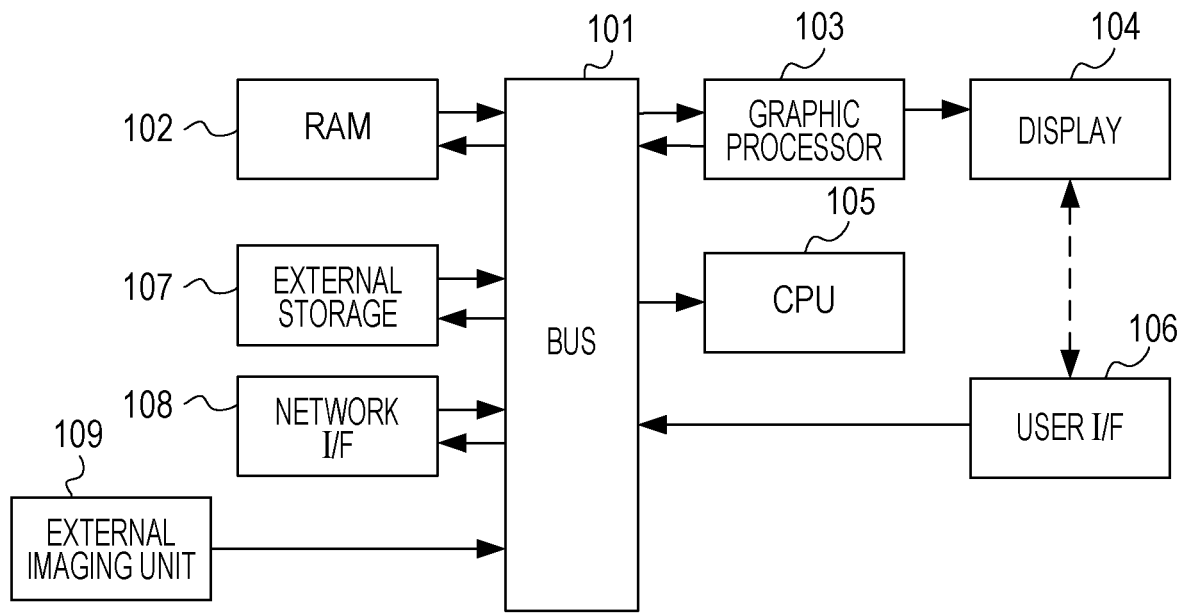
FIG. 1A is a diagram illustrating an example of a configuration of an image processing apparatus.

Embodiments of the present disclosure are described below in detail with reference to the accompanying drawings. Note that configurations of embodiments described below are merely examples, and the present disclosure are not limited to these illustrated configurations. In the embodiments described below, similar elements or similar processes are denoted by similar reference numerals.

First Embodiment

A first embodiment is described below, by way of example, for a case where to align images, image processing is performed such that a plurality of motion vectors are acquired from consecutive images (e.g., a cinematic sequence of images) and degrees of reliability thereof are calculated, and motion parameters representing an image position shift are acquired using motion vectors with high degrees of reliability. In the present embodiment, it is assumed by way of example that in the motion parameter acquisition process, a rotation matrix is determined by estimating the matrix from temporally consecutive images, and an electronic shake correction process is performed on the images.

The image processing apparatus according to the present embodiment performs a motion vector acquisition process to acquire a plurality of motion vectors from temporally consecutive image, and further performs a selection process to acquire, from the plurality of motion vectors, a motion vector of interest and a plurality of neighboring motion vectors neighboring the motion vector of interest. Hereinafter, the motion vector of interest will also be referred to as a vector of interest, and the neighboring motion vectors will also be referred to as neighboring vectors. The image processing apparatus then performs a similarity acquisition process to acquire a degree of similarity in motion between two motion vectors, and acquires a degree of reliability of the motion vector by determining a value related to the total number of neighboring vectors having high degrees of similarity to the vector of interest. That is, the image processing apparatus according to the present embodiment acquires the degree of reliability of the motion vector which is high in precision and accuracy by performing the reliability acquisition process described above. This ensures that the image processing apparatus according to the present embodiment is capable of acquiring a motion vector having a degree of reliability of precision and accuracy. In other words, it is ensured to exclude a motion vector which is low in precision and accuracy.

FIG. 1A is a diagram illustrating an example of an internal configuration of an information processing apparatus capable of executing a program to realize functions and processes of the image processing apparatus according to the present embodiment. In FIG. 1A, a personal computer (PC) is taken as an example of the information processing apparatus. The PC which can function as the image processing apparatus according to the present embodiment includes a CPU 105, a graphic processor 103, a RAM 102, an external storage 107, a network I/F 108, a bus 101, a display 104, and a user I/F 106. It is assumed that an external imaging unit 109 functioning as an imaging apparatus is connected to the PC. The CPU 105 may be a programmable device, processor, or circuit to execute instructions or programs to perform operations described in the following. Note that the external imaging unit 109 may be disposed in the PC. The display 104 may be an external display connected to the PC. In the present embodiment, the image processing apparatus (PC) performs image processing such that a moving image captured by the external imaging unit 109 is analyzed to detect feature points, a motion vector is acquired based on a degree of similarity of feature points, and a degree of reliability is calculated for the acquired motion vector. The configuration of the PC and the operation of each module thereof are described below with reference to FIG. 1A.

In FIG. 1A, the bus 101 allows data to flow in the PC. The RAM 102 is a writable memory and functions as a work area or the like of the CPU 105. The external storage 107 includes a non-volatile external storage medium and functions as a large-capacity memory. In the present embodiment, the external storage 107 is realized by a hard disk drive (HDD), but another type of storage apparatus such as an SSD (solid state drive using a flash memory) may be used. The external imaging unit 109 is an imaging apparatus such as a camera which can acquire a moving image of a subject or the like.

The graphic processor 103 is a processor that performs various calculation processes in displaying an image on the display 104. The graphic processor 103 is capable of performing a matrix operation and capable of performing a geometric transformation such as a rotation on an image according to the matrix. The display 104 is a display apparatus that displays a command input via the user I/F 106 and displays an output provided by the PC in response to the command.

The CPU 105 is a central processing unit which controls operations of the entire PC, in cooperation with other components, based on a computer program such as an operating system (OS) and an application program. In the present embodiment, as will be described in further detail later, the CPU 105 extracts feature points by analyzing images, acquires a motion vector based on the similarity of the feature points, and further performs various processes to calculate the degree of reliability of the motion vector. In the present embodiment, it is assumed by way of example that only one CPU 105 is used, but a plurality of CPUs may be used. In this case, processes can be performed in parallel by multi-thread processing. In the present embodiment, it is assumed by way of example that the CPU 105 performs the extraction of feature points by image analysis, the acquisition of motion vectors, the calculation of the degrees of reliability of the motion vectors, and other processes, but these image processing may be performed by the graphic processor 103.

The user I/F 106 accepts an instruction or a command input by a user. Information related to the instruction or the command input via the user I/F 106 is sent to the CPU 105 via the bus 101. In accordance with the input instruction or command, the CPU 105 performs a process such as loading and executing a program, controlling of the operation of the PC based, etc. The user I/F 106 includes a touch panel, a pointing device, a keyboard, and the like, but the user I/F 106 is not limited to a specific device. In the case where a touch panel or a pointing device is used as the user I/F 106, it acquires information on whether or not a user has touched at an arbitrary coordinate position on the display 104. The network I/F 108 is an interface via which data is transmitted and received to and from an external apparatus.

The program executed according to the present embodiment, the data related to the program, the moving image data acquired by the external imaging unit 109, etc. are stored in the external storage 107, and the program, the data, the moving image data and/or the like are input to the RAM 102 from the external storage 107 and executed or processed by the CPU 105. The program executed by the CPU 105 may cause the CPU 105 to function as various units described in the flowcharts shown in FIGS. 2, 3, and 5-9. Programs and data are input and output via the bus 101. Unless otherwise specified, image data is input from the external storage 107 and is converted to an internal image format when it is input. Image data can also be input from the external imaging unit 109 or the network I/F 108. In the present embodiment, an RGB image format is employed as the internal image format, but the internal image format is not limited to this. For example, a YUV image format, a monochrome luminance image format, or the like may be used. The motion detection is performed using an 8-bit luminance image, as will be described later. If the internal image format is the RGB image format or the YUV image format, the motion detection is performed after the image is converted into the 8-bit luminance image. In the present embodiment, it is assumed that the temporally consecutive images are each given by an image of a frame constituting the moving image. It is further assumed by way of example that the image size is 1920×1088 pixels, and the frame rate is 60 fps. A UI (user interface) screen and a resultant processed image can be displayed on the display 104 via the graphic processor 103. The graphic processor 103 is capable of performing a geometric transformation on the input image. A resultant image obtained via the geometric transformation may be stored in the RAM 102 or may be directly output to the display 104. It is also assumed that the processed data is allowed to be stored in the external storage 107 or in the RAM 102, and the processed data is allowed to be shared with other programs.

Figure 1B:
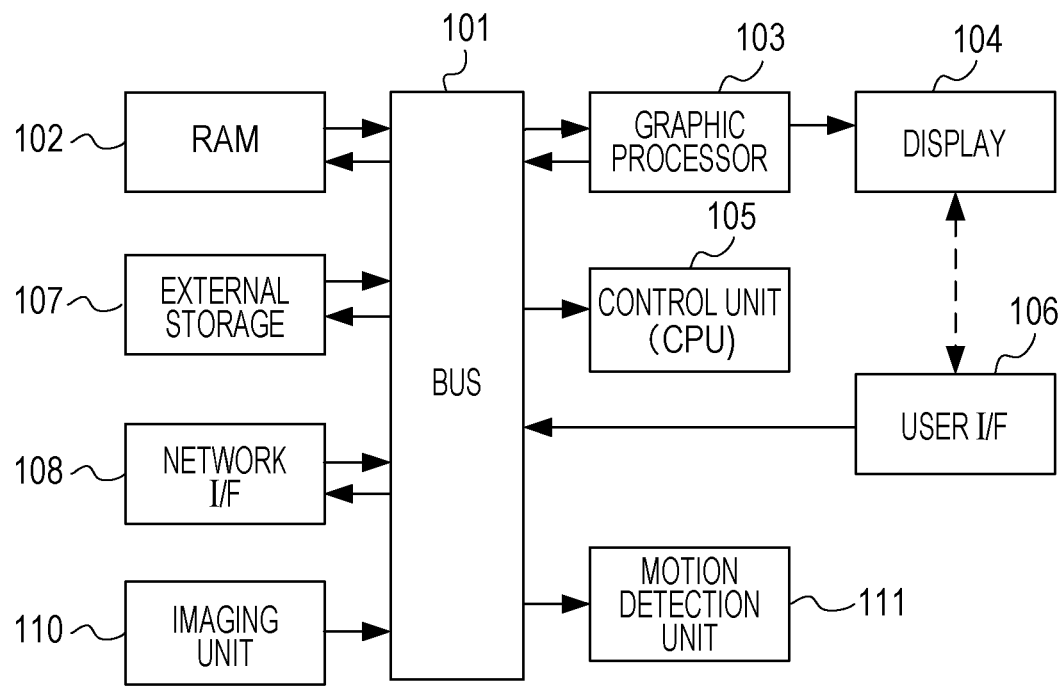
FIG. 1B is a diagram illustrating an example of an application.

In the present embodiment, it is assumed by way of example but not limitation that the image processing apparatus that performs the electronic shake correction process is realized by a PC. The electronic shake correction process according to the present embodiment can be carried out by an information apparatus such as a camera apparatus, an embedded system, a tablet terminal, or a smartphone. Part or all of the electronic shake correction process may be performed by hardware. FIG. 1B illustrates an example of a configuration of a camera apparatus, which is an example of an application of the image processing apparatus according to the present embodiment. The camera apparatus shown in FIG. 1B includes an imaging unit 110 and a motion detection unit 111. The imaging unit 110 captures an image and sends the captured image to the bus 101. The motion detection unit 111 detects a motion vector from the image. Modules shown in FIG. 1B other than the imaging unit 110 and the motion detection unit 111, that is, modules denoted by reference numerals 101 to 108 such as a bus 101, a network I/F 108, and so on are similar to modules of the PC denoted by similar reference numerals in FIG. 1A. As in this example, the processes according to the present embodiment can also be executed by the camera apparatus.

FIG. 2 is a flowchart illustrating a processing flow in which a homography matrix is estimated from temporally consecutive images and an electronic shake correction process is performed based on the estimated homography matrix. In the following description of the flowchart, unless otherwise specified, processes denoted by step numbers each having a prefix of "S" are executed in the order represented by arrows. However, processes which are independent of each other may not be executed in the order of the described step numbers, but the processes may be executed in a different order, or in a case there are a plurality of CPUs, the processes may be executed in parallel. Similarly, there is no particular restriction on positions of subroutines including steps. As long as the same processing result can be obtained, a different subroutine may be used to perform a process. Furthermore, there is no particular restriction on configurations of subroutines. In the following description, the processes performed by the image processing apparatus according to the present embodiment are described by way of example for the case where the image processing apparatus has the configuration and modules shown in FIG. 1A.

In S201, temporally consecutive images (frames of images of a moving image) captured by, for example, the external imaging unit 109, and stored in the external storage 107 are input sequentially in the order of frames, and the CPU 105 performs a motion detection based on the frames of images. For example, when luminance images of a (c−1)th frame and a c-th frame are input, the CPU 105 detects a motion vector corresponding to a change in image from the (c−1)th frame to the c-th frame. Note that it is assumed that the temporally consecutive frames of the input image are assigned serial frame numbers starting from 0, and the process of detecting the motion vector is started for the frame with the frame number of 1. Each time the process in S201 is executed, the value of c is incremented.

The motion detection is performed by detecting feature points from images, matching feature values of the feature points between images, and determining the motion vector based on the positional correspondence between feature points. In the feature point detection, it is desirable to use a method in which an image is divided into blocks with the same size, and the number of feature points to be detected in each block is set. In present embodiment, it is assumed by way of example that each image is divided into 8 parts vertically and 10 parts horizontally and thus into a total of 80 blocks, and 100 feature points are detected in each block. However, the motion detection algorithm is not limited to this. For example, a luminance image may be divided into a total of 8160 blocks each including 16×16 pixels, and a motion search using SAD is performed in units of blocks.

In the present embodiment, one motion vector is given by a directed line segment represented by coordinates of its start point and coordinates of its end point, that is, one motion vector is represented as v={A, B}={(x', y'), (x, y)}, where A denotes the start point of the motion vector and B denotes the end point of the motion vector. In the present embodiment, pure vector elements of a motion vector v are expressed as $Cv=C_{AB}=(x-x', y-y')$. Furthermore, when X denotes a set of a plurality of motion vectors and i denotes an index number identifying a motion vector in the set X, each motion vector can be represented as $v_i=\{A_i, B_i\}=\{(x_i', y_i'), (x_i, y_i)\}$. The set X is represented as $X=\{v_1, v_2, v_3, \ldots\}$. Hereinafter, unless otherwise specified, v, A, B, x', y', x, y, Cv, and $C_{AB}$ with the same subscript i denote a motion vector and elements of the same motion vector. In the present embodiment, each numerical value is represented and treated in the form of a floating-point number, but it may be represented and treated in the form of a fixed-point number. When a pixel is referred to, each of coordinate values of the pixel is expressed, unless otherwise specified, by a numerical value rounded down to a nearest whole number. In the present embodiment, each set is implemented by an array, and elements of the set X are given by $v_i=X[i]$ of a motion vector, or given by $Cv_i=C_X[i]$ of a vector element, and motion vectors and vector elements given as elements of the set can be referred to. The number of elements of a set is expressed by enclosing a symbol of the set between two vertical lines. That is, the number of elements of the set X is expressed as |X|. The set is not limited to being implemented by an array, but may be implemented, for example, in the form of a list.

Next, in S202, the CPU 105 estimates a transformation matrix from the motion detection result acquired in the above-described manner. Details of the process of estimating the transformation matrix will be described later with reference to FIG. 3. In the present embodiment, the transformation matrix, which represents a change from the (c−1)th frame to the c-th frame, is denoted by $H_c$. In the following description of the present embodiment, it is assumed by way of example that the transformation matrix $H_c$ is a 3{×}3 rotation matrix (see Reference 1 described above). Note that the matrix may be another type of matrix such as an affine transformation matrix or a homography matrix.

Next, in S203, the CPU 105 determines whether the number of estimated transformation matrices has reached a value equal to or greater than the number of shaking frame period needed to generate a shake correction matrix. When the shaking frame period is denoted by p, if c p is true, the CPU 105 proceeds to S204, but if c≥p is false, the CPU 105 proceeds to S201. The value of p is, for example, 16, but there is no restriction on the value of p. A large value may be set to p to suppress long-period shaking, while a small value may be set to p to suppress only short-period shaking.

Next, in S204, the CPU 105 generates a shake correction matrix from a plurality of estimated transformation matrices. The purpose of the shake correction is to suppress high frequency shaking, and the shake correction matrix is obtained by smoothing transformation matrices over a plurality of frames. In the present embodiment, the CPU 105 determines a shake correction matrix based on transformation matrices for past frames and an immediately previous shake correction matrix. For example, when a shake correction matrix for a c-th frame is denoted as Sc, the shake correction matrix Sc can be calculated according to a following equation (1).

$$S_c = \sqrt[p']{\prod_{i=c-p'+1}^{c} H_i \times S_{c-1}^{-1}} \times S_{c-1} \times H_{c-p'+1}^{-1} \text{ where } p' = \min(c, p) \quad (1)$$

In the calculation according to equation (1), the radical root of the matrix may be determined by an approximate calculation. More specifically, for example, the radical root may be calculated according to a method disclosed in Reference 2 described above. Note that there is a possibility that there are a plurality of radical roots of a matrix, and thus a constraint is set to determine a unique matrix. In the present embodiment, since the matrix is a rotation matrix, the constraint is imposed such that a matrix with a smallest rotation is selected. In a case where a radical root of a matrix cannot be calculated, a unit matrix is employed as the shake correction matrix Sc. Note that the method of smoothing matrices is not limited to the example described above.

Next, in S205, the graphic processor 103 performs a geometric transformation on an image using the shake correction matrix determined in the above-described manner. In the present embodiment, the RGB image of the (c−p+1)th frame is input to the graphic processor 103, and processing is performed for each RGB channel. Here, let $(x_{out}, y_{out})$ denote a pixel position of an output image obtained as a result of the geometric transformation, and let $(x_{in}, y_{in})$ denote a pixel position of an input image. Furthermore, let M denote a transformation matrix from the output image to the input image, which is given by equation (2) shown below.

$$M = \begin{pmatrix} m_{11} & m_{12} & m_{13} \\ m_{21} & m_{22} & m_{23} \\ m_{31} & m_{32} & m_{33} \end{pmatrix} \quad (2)$$

The pixel position $(x_{in}, y_{in})$ can be calculated from the pixel position $(x_{out}, y_{out})$ of the output image using a proj function given by equation (3) shown below.

$$\begin{pmatrix} x_{in} \\ y_{in} \end{pmatrix} = proj(M, (x_{out}, y_{out})^t) = \begin{pmatrix} m_{11} & m_{12} & m_{13} \\ m_{21} & m_{22} & m_{23} \end{pmatrix} \begin{pmatrix} x_{out} \\ y_{out} \\ w \end{pmatrix}, \quad (3)$$

$$\text{where } w = \frac{1}{m_{31}x_{out} + m_{32}y_{out} + m_{33}}$$

In S205, the graphic processor 103 selects one pixel of the output image and calculates the position of a pixel of the input image corresponding to the selected pixel of the output image using the proj function where M is given by $M=S^{-1}$, while selecting the pixel from one to another by scanning the pixels of the output image. Then, the graphic processor 103 assigns a pixel value of the corresponding pixel of the input image as a pixel value of the selected pixel of the output image. The graphic processor 103 performs this process for all pixels of the output image thereby determining the pixel values of all pixels of the output image. In view of the fact that the pixel positions $(x_{in}, y_{in})$ of the input image have decimal values, more accurate pixel values may be determined using a method of interpolating such as bilinear, bicubic, or the like. The image obtained as a result of the above-described conversion is displayed on the display 104, and is further encoded and the resultant encoded image is stored in the external storage 107.

Next, in S206, the CPU 105 determines whether the process has been performed for all input images. In a case where it is determined that the process has been performed for all input images, the process in the flowchart shown in FIG. 2 is ended. However, in a case where there is one or more images that have not yet been processed, the processing flow proceeds to S201 to repeat processes from S201 to S206. In the present embodiment, the process is ended when it is determined that all input images have been processed. However, the process end condition is not limited to this. For example, the CPU 105 may determine whether a user has performed a UI operation to issue a process end instruction, and if it is determined that the process end instruction has been issued, the process may be ended.

FIG. 3 is a flowchart illustrating the flow of a process of estimating a transformation matrix according to the present embodiment. In S301, the CPU 105 scans the blocks obtained by dividing an image and selects the block one by one, and acquires a set of motion vectors in each block.

Figures 4A, 4B:
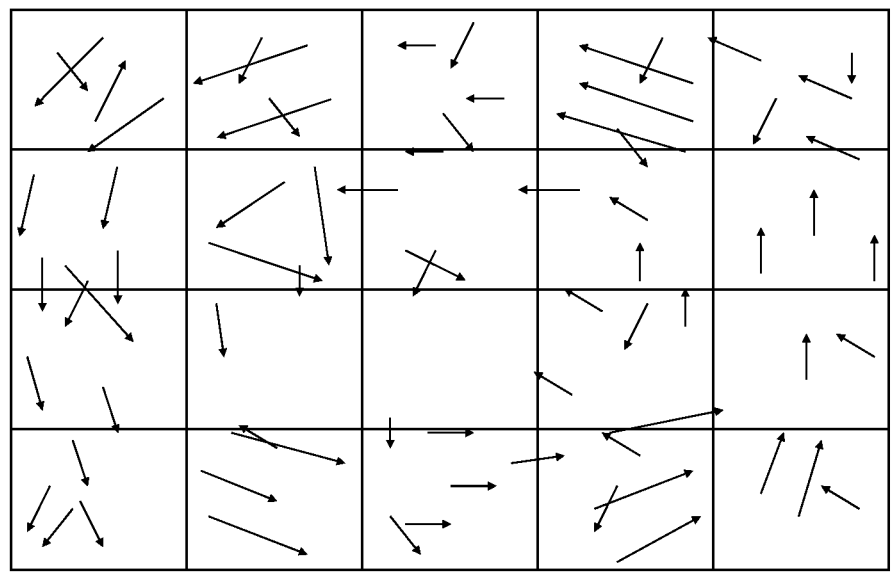
FIG. 4A is a diagram illustrating an example of a manner of dividing an image.
FIG. 4B is a diagram illustrating examples of motion vectors.

Referring to FIGS. 4A and 4B, a method of scanning blocks is described in detail below. FIG. 4A is a diagram illustrating a manner of dividing an image into blocks, and a manner of assigning a block number to each block. In the present embodiment, the CPU 105 scans the blocks in a raster order, and more specifically, for example, in the order of the block numbers shown in FIG. 4A. That is, when the CPU 105 executes the process in S301 for the 1st time, the block with the block number of 1 is subjected to the process. When the process in S301 is executed for the 2nd time, 3rd time, and so on, the blocks with the block numbers of 2, 3, and so on are subjected to the process. In S301, the CPU 105 inputs a motion vector whose end point (an arrow tip) is located in a target block being subjected to the process in 301. In the present embodiment, the block number is denoted by d, and a block with a block number of d is denoted as a block d. Furthermore, the largest block number is denoted by $d_{max}$. In the present embodiment, $d_{max}=20$. The block number d starts from 1, and the block number d is incremented each time the process in S301 is executed. Also in the motion detection method, an image is divided into blocks. The block division positions in this process may not be equal to those used in S301. However, to achieve the complete equality in the number of motion vectors in each block, it is desirable that the block division positions in the motion detection are the same as those used in the process S301.

FIG. 4B is a diagram illustrating states of motion vectors, in which each arrow represents a motion vector. As shown by way of example in FIG. 4B, there is a possibility that a motion vector extends across a border between blocks. Therefore, in the present embodiment, a block including an end of a motion vector v is regarded as a block corresponding to the motion vector v. When in(d, B) denotes a function indicating whether an end point B of a motion vector v is located within a block d, a set $Y_d$ of vectors included in the block d can be represented by equation (4) shown below.

$$Y_d=\{v \in X | in(d,B)=\text{true}\}, \text{ where } v=\{A,B\} \quad (4)$$

Note that the notation of equation (4) indicates that elements of the set X are scanned and elements satisfying a condition expressed following | are extracted thereby generating a subset $Y_d$ of the extracted elements. Hereinafter, a generation of a subset is described using a similar notation.

Instead of generating a new array or list as a subset, a flag may be provided for each element to indicate whether the element is an element of a subset, and the value of the flag may be set when the element is extracted. In this case, the elements of the subset can be acquired by scanning the elements of an upper set each time the process is executed, and referring to the flags of the elements to determine whether the elements are included in the subset. Note that the set $Y_d$ may be generated in advance, and, in S301, the generated set $Y_d$ may be simply input. In the present embodiment, by way of example, the image is divided into 20 blocks as shown in FIG. 4, but the image may be divided in another manner. Furthermore, in the present embodiment, by way of example, a motion vector whose end point is located within a block is input, but a motion vector whose start point is located within a block may be input. The order of scanning blocks is not limited to the raster order. When neighbor(d, B) denotes a function that indicates whether or not an end point B of a motion vector is included in a block of interest or in one of eight blocks neighboring the block of interest, a set $Y'_d$ of vectors may be generated according to equation (5) shown below.

$$Y'_d=\{v \in X | \text{neighbor}(d,B)=\text{true}\}, \text{ where } v=\{A,B\} \quad (5)$$

For example, in the case of a block with a block number 9, the block with the block number 9 and neighboring eight blocks are given by nine blocks surrounded by thick lines in FIG. 4A. However, in a case where some surrounding block exists outside the screen, the set $Y'_d$ of vectors is generated from blocks located inside the screen.

Next, in S302, the CPU 105 calculates a value related to the total number of neighboring vectors having high degrees of similarity (having SAD values equal to or lower than a threshold value) to the vector of interest, and employs the calculated value as the degree of reliability of the motion vector. The degree of reliability is a measure indicating whether neighboring vectors are similar to the vector of interest. For example, the degree of reliability n is calculated according to equations (6) and (7) shown below. Note that i of the degree of reliability $r_i$ denotes an index value of a motion vector in a block. The CPU 105 calculates the degree of reliability for all vectors in each block.

$$r_i = \sum_{\mu_j \subset Y''_d} f\big((v_i, -\mu_j)^2 \le e^2\big) | v_i \subset Y_d \quad (6)$$

$$f(x) = \begin{cases} 1 & \text{if } x = \text{true} \\ 0 & \text{else} \end{cases} \quad (7)$$

Note that $Y''_d$ is $Y''_d=Y_d$ or $Y''_d=Y'_d$. In the former case, only motion vectors in a block of interest are referred to, and thus a small amount of calculation is required, while in the latter case, motion vectors of eight neighboring blocks in addition to the motion vector in the block of interest are referred to, and thus referring to the large number of motion vectors allows an increase in accuracy. The following description is given for the case where $Y''_d=Y_d$. Furthermore, in the present embodiment, it is assumed that e in equation (6) is e=1. Details of this process will be described later with reference to FIG. 5.

Next, in S303, the CPU 105 performs a determination process on the degrees of reliability of motion vectors using a predetermined threshold value thereby extracting motion vectors having high degrees of reliability. In the present embodiment, the degree of reliability of a motion vector is a measure indicating whether differences of neighboring vectors from the vector of interest are small, and the predetermined threshold value is set as a value for determining whether the difference is small. The CPU 105 extracts motion vectors with degrees of reliability higher than the threshold value as motion vectors having high degrees of reliability. A set of motion vectors extracted via the determination process using the threshold value regarding the degree of reliability, for example, a set of motion vectors $V_d$ extracted in the block d of the c-th frame is expressed by equation (8) shown below.

$$V_d = \{v_i \in X / r_i > th\} \quad (8)$$

In equation (8), the threshold value th depends on the density of the motion vectors. In the present embodiment, th is given by th=|Y''$_d$|×0.1. Note that in S302, $r_i$ may be normalized by dividing it by |Y''$_d$|, and the threshold value may be given by th=0.1.

Next, in S304, the CPU 105 determines whether or not the process is completed for all blocks. In a case where it is determined that the process is completed for all blocks, the CPU 105 proceeds to S305. However, in a case where the process is not completed for all blocks, the CPU 105 proceeds to S301 to repeat processes from S301 to S304.

When the CPU 105 proceeds to S305, CPU 105 inputs the motion vectors extracted from all blocks and estimates a rotation matrix. In this embodiment, it is assumed that the allowable error $e_h$ is 3, and, under this assumption, the subroutine that executes RANSAC is called. The details of the subroutine of estimating the rotation matrix will be described later with reference to FIG. 6.

Figure 5:
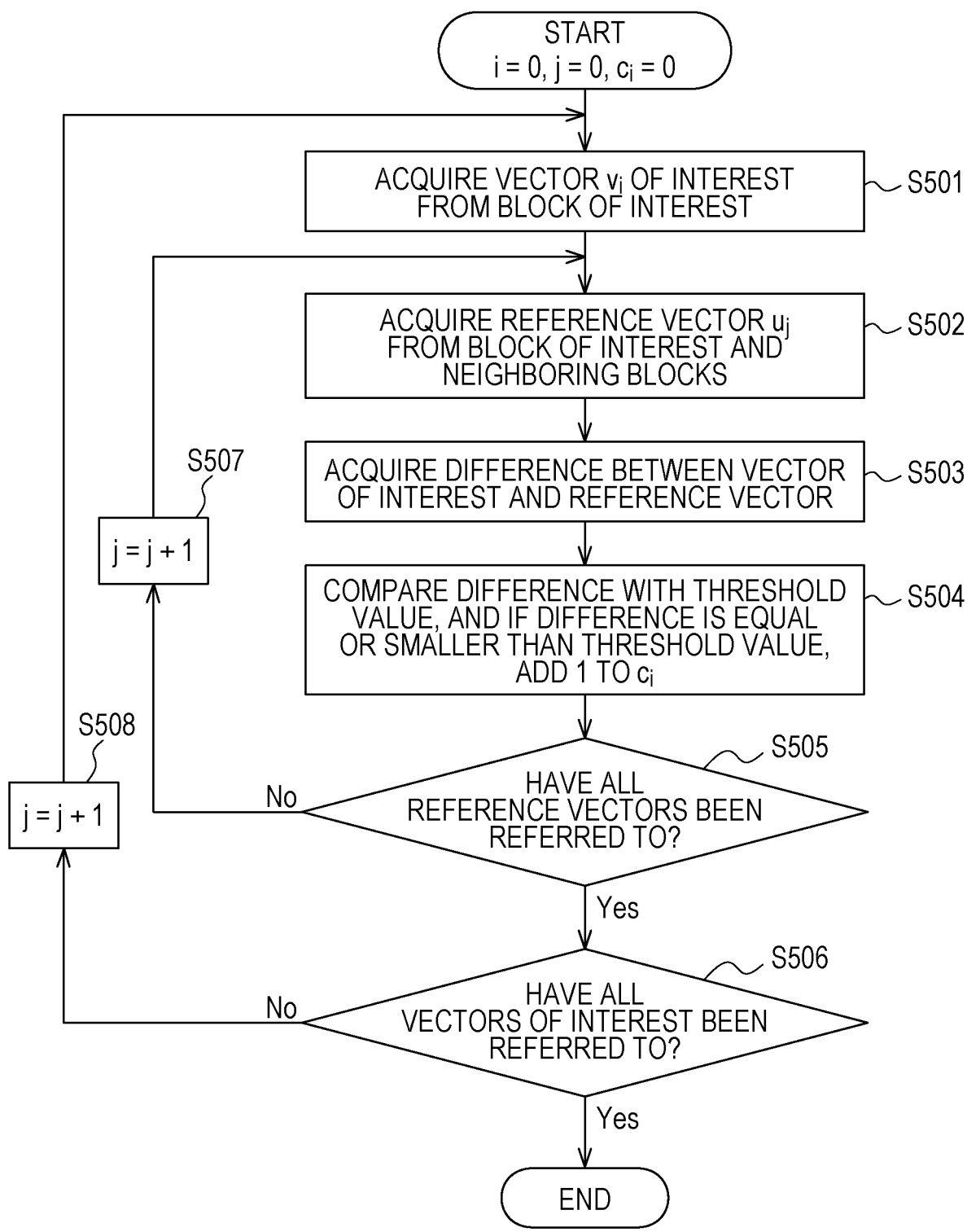
FIG. 5 is a flowchart of a process of calculating a degree of reliability according to the first embodiment.

Next, the flow of the process of calculating the degree of reliability is described with reference to a flowchart shown in FIG. 5. In the following description, variables i, j, and $c_i$ are each initialized to 0. First, in S501, the CPU 105 acquires a vector $v_i$ of interest from a block of interest. That is, by this process, an i-th motion vector is acquired from the set $Y_d$ of motion vectors. Next, in S502, the CPU 105 acquires motion vectors included in blocks neighboring the block of interest as neighboring vectors, and acquires a reference vector from the motion vectors included in the block of interest and the neighboring blocks. That is, by this process, a j-th motion vector is acquired from the set Y''$_d$ of motion vectors as a reference vector.

Next, in S503, the CPU 105 calculates the difference between the vector of interest and the reference vector. The norm value of the difference between the vector of interest and the reference vector represents the degree of similarity in motion between the two motion vectors. Then, in S504, the CPU 105 performs a determination process using a threshold value for the norm value of the difference calculated in S503. In a case where the difference (the norm value) is equal to or smaller than the threshold value, 1 is added to the variable $c_i$. In this embodiment, the threshold value is 1. That is, when the norm value from the vector of interest is equal to or smaller than the threshold value, the neighboring vector is determined to have a high degree of similarity, and thus the total number of motion vector related to the value of the degree of reliability is incremented.

Next, in S505, the CPU 105 determines whether all reference vectors have been referred to. That is, in S505, the CPU 105 determines whether all elements of the set Y''$_d$ have been referenced. In a case where it is determined that all reference vectors have been referred to, the CPU 105 executes a process in S506. However, in a case where all reference vectors have not been referred to, the CPU 105 executes a process in S507. In S506, the CPU 105 determines whether all vectors of interest have been referred to.

That is, the CPU 105 determines whether all elements of $Y_d$ have been referred to. In a case where it is determined that all vectors of interest have been referred to, the CPU 105 ends the process shown in FIG. 5. However, in a case where all vectors of interest have not been referred to, the CPU 105 performs a process in S508. When the CPU 105 proceeds to S507, the CPU 105 increments j and then returns to the process in S501. Further, when proceeding to S508, the CPU 105 returns to the processing of S501 after incrementing i. When the process of the flowchart shown in FIG. 5 is ended, the value stored in the variable $c_i$ indicates the degree of reliability.

Figure 6:
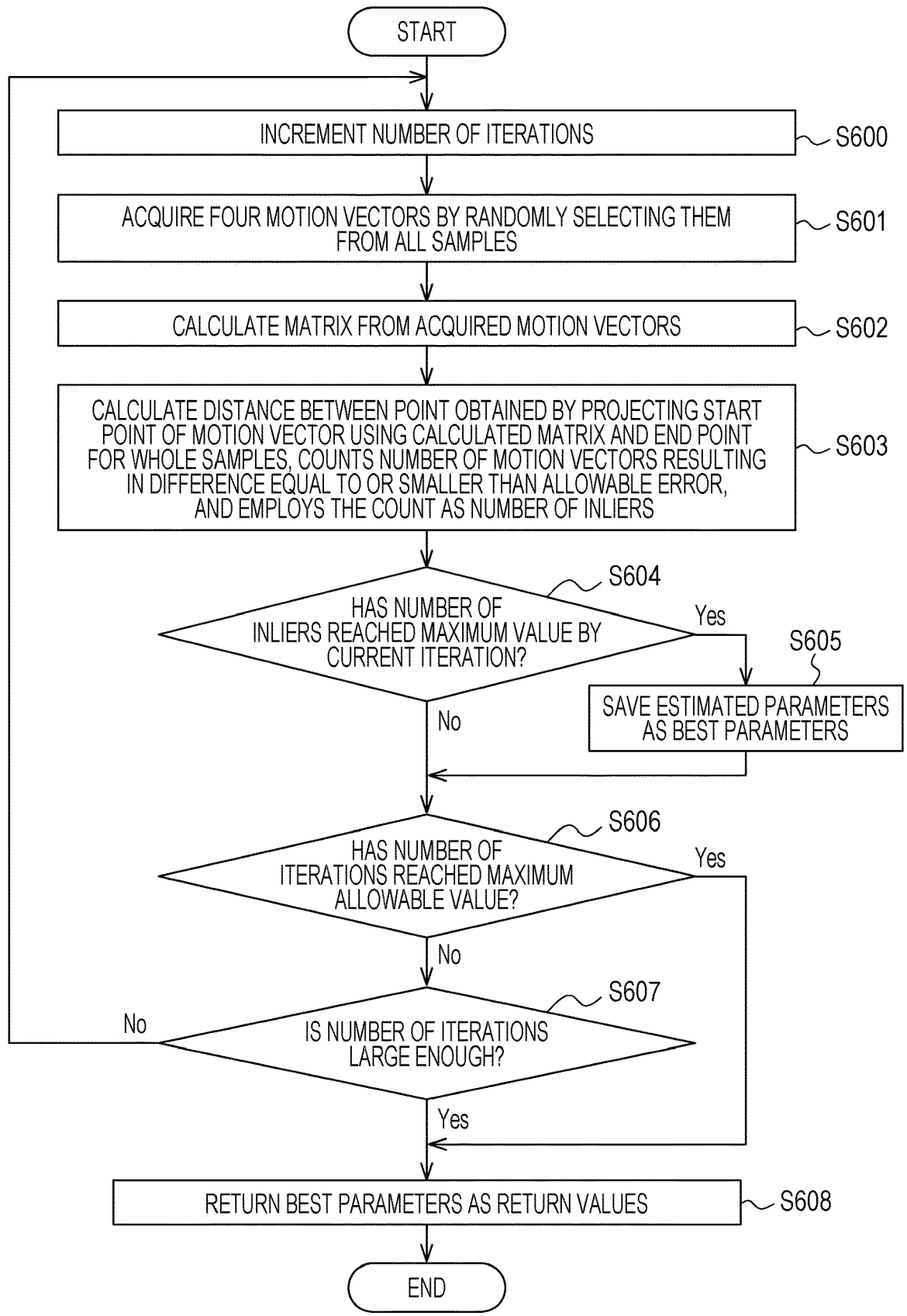
FIG. 6 is a flowchart of a RANSAC process.

FIG. 6 is a flowchart illustrating a subroutine of the process of estimating the rotation matrix. The process according to the present embodiment is described below for the case where the RANSAC method is employed. In S600, the CPU 105 increments the number of iterations. Next, in S601, the CPU 105 acquires four motion vectors from the entire input samples. In the present embodiment, the entire input samples are given by a set of motion vectors extracted from all blocks via the process of the flowchart shown in FIG. 3. That is, the entire input samples Z are expressed by equation (9) shown below.

$$Z = \{v \in V_d | 1 \le d \le d_{max}\} \quad (9)$$

Next, in S602, the CPU 105 calculates a matrix from the four motion vectors. The resultant motion vector obtained via this calculation is denoted as $v_j$ (where j is 1 to 4). The matrix to be calculated here is the transformation matrix $H_c$ estimated in in S202. The transformation matrix $H_c$ is represented by equation (10) shown below.

$$H_c = \begin{pmatrix} h_{11} & h_{12} & h_{13} \\ h_{21} & h_{22} & h_{23} \\ h_{31} & h_{32} & h_{33} \end{pmatrix} \quad (10)$$

Next, in S602, the CPU 105 determines elements of a rotation matrix satisfying equation (11) shown below by solving the equation.

$$\begin{pmatrix} x'_j \\ y'_j \\ 1 \end{pmatrix} = H_c \begin{pmatrix} x_j \\ y_j \\ 1 \end{pmatrix} \quad (11)$$

There are various methods for calculating the matrix, and an example of a method of calculating a rotation matrix is described, for example, in Reference 1, and thus a detailed description thereof is omitted. However, depending on the matrix calculation method, there is a possibility that a matrix cannot be calculated depending on a manner of selecting samples. Therefore, the CPU 105 determines whether a matrix of interest is successfully calculated. In a case where it is determined that the calculation of the matrix failed, the CPU 105 proceeds to S600 to execute the process again.

Next, in S603, the CPU 105 calculates the distance between a point obtained by projecting a start point of a motion vector using the calculated matrix and an end point of the motion vector for the entire samples, and counts the number of the data whose distance is equal to or smaller than an allowable error. The CPU 105 employs the counted number as the number of inliers. This allowable error is given by the $e_h$ described above. The number of inliers $c_{Hinlier}$ in the rotation matrix estimation can be calculated according to equation (12) shown below.

$$c_{Hinlier}=|\{v \in Z| \text{dist}((\text{proj}(H_c, (x', y')^t))^t - (x, y)) \le e_h\}| \quad (12)$$

where $v=\{(x', y'), (x, y)\}$

Next, in S604, the CPU 105 determines whether or the number of inliers obtained up to the present iteration has reached the maximum value. In a case where the determination in S604 is affirmative, the CPU 105 process to S605, but otherwise the CPU 105 proceeds to S606. As an exception, in the first execution of S604, the CPU 105 has to proceed to S605.

In S605, CPU 105 saves the acquired motion vector as best parameters. Next, in S606, the CPU 105 determines whether the number of iterations has reached the upper limit. In the present embodiment, it is assumed that the upper limit is 50. However, there is no particular restriction on the value of the upper limit. For example, in a case where the frame rate of an input moving image is 60 fps, it is necessary that the process of the flowchart shown in FIG. 2 is completed within 16 ms. Therefore, the optimum value of the upper limit is determined by the specifications of the CPU and the number of CPUs 105 used. In a case where it is determined that the number of iterations has reached the upper limit, the CPU 105 proceeds to S608, but in a case where it is determined that the number of iterations has not reached the upper limit, the CPU 105 proceeds to S607.

In S607, the CPU 105 determines whether the number of iterations is large enough. In a case where it is determined that the number of iterations is large enough, the CPU 105 proceeds to S608, but in a case where it is determined that the number of iterations is not large enough, the CPU 105 proceeds to S600. In this determination in S607, when the number of iterations is greater than the value of N calculated according to equation (13) shown below, it is determined that the number of iterations is large enough.

$$N=\log(1-p)/\log(1-(r_{inlier})^m) \quad (13)$$

In equation (13), p is the probability that at least one correct sample exists. In the present embodiment, it is assumed that a correct sample exists with a probability of 99%, and thus p=0.99. In equation (13), m is the degree of freedom of parameters. In the preset embodiment, a two-dimensional vector is determined, and thus m=2. The value of $r_{inlier}$ is calculated according to equation (14) shown below.

$$r_{inlier}=C_{inlier}/|V_d| \quad (14)$$

Note that $c_{inlier}$ is the number of inliers calculated in S603. $|Vd|$ is the number of elements of the motion vector extracted in S303.

Next, in S608, the CPU 105 returns the best parameters as return values. In the present embodiment, the best parameters are given by a two-dimensional vector, which corresponds to a representative vector of a block.

As described above, in the present embodiment, the degree of reliability of a motion vector is determined by counting the number of similar motion vectors neighboring the vector of interest and employing a value related to the total number of similar motion vectors as the degree of reliability of the motion vector. Even when a motion vector is erroneously detected, the probability is low that vectors neighboring the vector of interest are determined to be similar to the vector of interest, the degree of reliability calculated in the above-described manner is effective. In a case where motion vectors with a high outlier rate are input, and a rotation matrix is estimated from these input motion vectors using RANSAC, a problem may occur that a large number of iterations are required. An M estimation technique is known as one of robust estimation techniques. The M estimation needs a relatively low processing capacity, and needs a short processing time. However, when the outlier rate is high, the M estimation does not provide a good estimation result. In the present embodiment, degrees of reliability of motion vectors are compared with a threshold value, and motion vectors which are low in the degree of reliability are excluded. This makes it possible to exclude outliers of motion vectors from being used in the rotation matrix estimation. This results in a reduction in the number of iterations in the RANSAC process, or an increase in the estimation performance of the M estimation. The process of calculating the degree of reliability does not include complicated matrix operations, and thus needs a very small amount of computing operation. Therefore, for example, by applying the degree of reliability to RANSAC, it is possible to achieve a large reduction in the total processing time even when the overhead of the calculation of the degree of reliability performed as preprocessing is taken into consideration. For example, to process a 60-fps moving image, it is necessary to complete the processing of one frame within 16 ms. Therefore, it is necessary to set an upper limit on the number of iterations. Even in this case, by performing the process according to the present embodiment, it becomes possible for the number of iterations to be unlikely to reach the upper limit, and thus it becomes possible to stably estimate the matrix. As a result, in performing an image shake correction using a matrix, it is possible to reduce the probability that the matrix estimation fails, and it becomes possible to achieve a more stable and more natural image shake correction. In the present embodiment, the determination of the representative vector and the extraction of the similar vectors have been described above, by way of example, for the case where image shake correction is performed. However, the application is not limited to the image shake correction, and the technique disclosed can be used in other applications such as an image composition.

In the present embodiment, it is determined in S505 whether or not the process is completed for all elements. The process is not limited to this example. For example, incrementing of j in S507 may be performed such that j is incremented by 2 or 3 in S507, and the determination as to whether the process is completed for all elements may be performed by checking whether the end of the set of the motion vector of the block of interest and the motion vectors of the blocks neighboring the block of interest has been reached. In S302, the threshold value e=1 is employed, but this value may be set depending on the imaging target, conditions such as the frame rate, and/or the like. Since the purpose of the present embodiment is to provide a technique of the image shake correction, it is necessary to remove a background motion. Since the background can be regarded as a rigid body, the threshold value e is set to a relatively small value. However, to detect a motion of a soft body such as a human, an animal, or the like, it is desirable to set e to a relatively large value such as 3.

Second Embodiment

A second embodiment is described below, in which a rotation matrix is estimated from temporally consecutive images and perform an electronic shake correction process based on the rotation matrix. In the second embodiment, instead of executing the respective processes in S302 and S303 of the flowchart shown in FIG. 3 according to the first embodiment, the image processing apparatus executes processes in S702 and S703 in the flowchart shown in FIG. 7. Furthermore, the second embodiment includes an additional process performed in S701. The other steps are the same as those according to the first embodiment, and thus a further description thereof is omitted.

In the second embodiment, the SAD representing the degree of similarity of images is calculated in units of blocks each including 16×16 pixels of luminance image, and a motion search is performed based on the SAD. The motion search is an algorithm for searching for a motion vector with a minimum SAD value. However, in addition to the minimum SAD value, a next minimum the SAD value is also stored for each detected motion vector.

Figure 7:
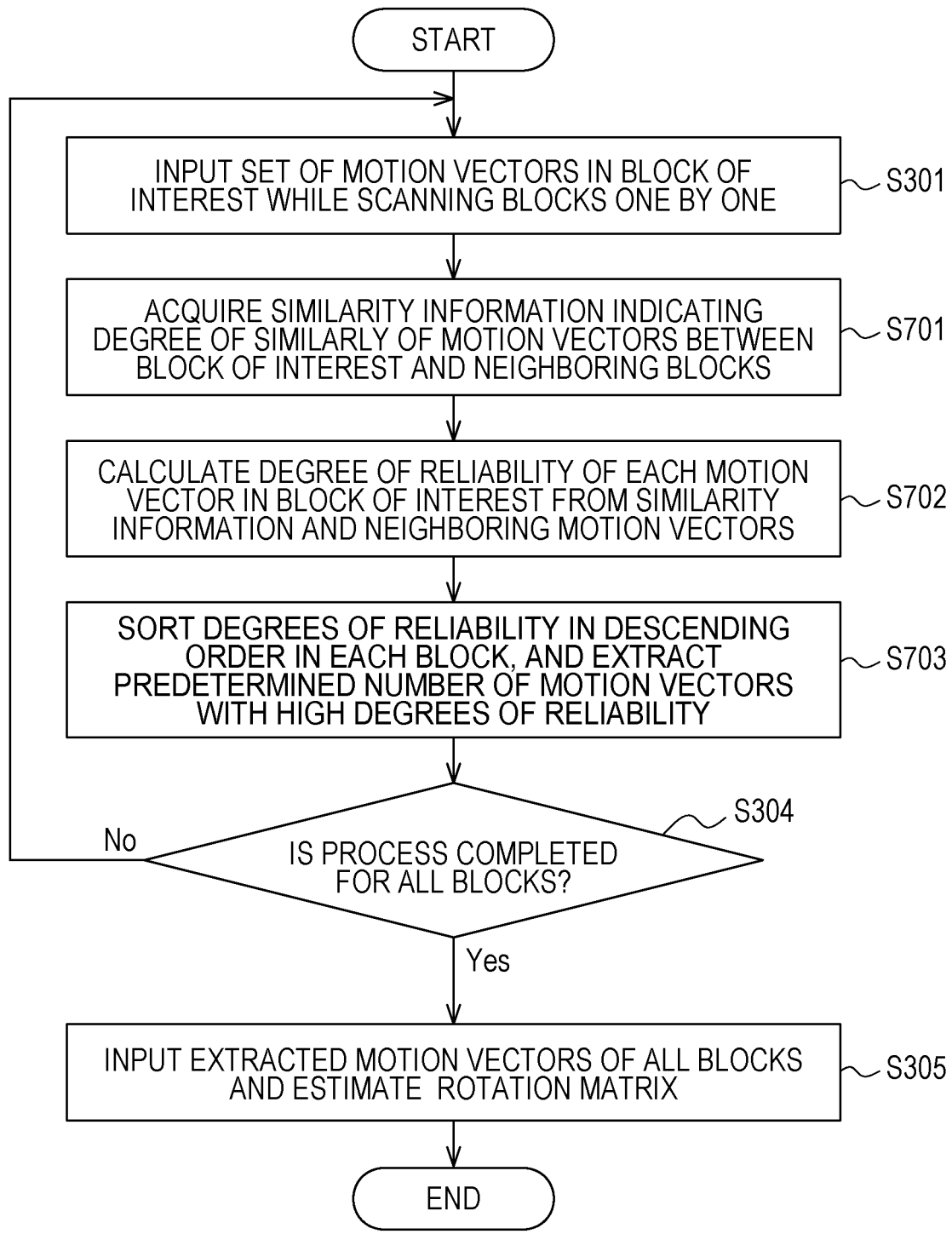
FIG. 7 is a flowchart of a process of estimating a transformation matrix according to a second embodiment.

FIG. 7 is a flowchart of a process of extracting similar vectors according to the second embodiment. In the second embodiment, after the process in S301 is completed, the CPU 105 advances the process to S701. In S701, the CPU 105 performs information acquisition process to acquire image similarity information indicating degrees of similarity between a motion vector in a block of interest and motion vectors in respective neighboring blocks. This corresponds to performing the process in S302 such that $Y''_d = Y'_d$ in the first embodiment. In the present embodiment, SAD is used for indicating the image similarity. Note that the lower the value of SAD, the higher the degree of image similarity. In the present embodiment, SAD is used in the image similarity information of the motion vector. In the present embodiment, in the motion search, a motion vector with a highest degree of similarity is selected, and the SAD value of this selected motion vector is denoted by $dist_{i,1}$. Furthermore, in the present embodiment, a motion vector with a next highest degree of similarity is also selected, and the SAD value of this selected motion vector is denoted by $dist_{i,2}$. In the present embodiment, these two SAD values $dist_{i,1}$ and $dist_{i,2}$ are acquired as image similarity information of the motion vector.

In the present embodiment, in the reliability acquisition process, the degree of reliability of the motion vector is calculated based on the number of neighboring motion vectors having high degrees of similarity and the image similarity information. In the present embodiment, the degree of reliability of the motion vector is determined based on the ratio, coeff, between the image similarity of the motion vector with the highest degree of similarity in the motion vector search and the image similarity of the motion vector with the next highest degree of similarity.

That is, in S702, the CPU 105 calculates the reliability information on each motion vector in a block of interest from the image similarity information and neighboring vectors according to equation (15) and equation (16) shown below.

$$r_i = \sum_{\mu_j \subset Y''_d} coeff(j) f((v_i - \mu_j)^2 \leq e^2) / |Y''_d| \qquad (15)$$

$$coeff(i) = \frac{dist_{i,2} + \text{offset}}{dist_{i,1} + \text{offset}} \qquad (16)$$

Here, coeff is described below. In the equation of coeff, a first candidate is in the denominator and a second candidate is in the numerator. Therefore, the smaller the SAD of the first candidate is compared to the SAD of the second candidate, the greater the coeff and the higher the degree of reliability. In equation (16), SAD can take 0, and thus offset is introduced to prevent an occurrence of division by zero.

In the present embodiment, by way of example, offset=3. For example, in a case where $dist_{i,1}=10$ and $dist_{i,2}=20$, coeff(i) is given as 23/13=1.77. In a case where $dist_{i,1}=0$ and $dist_{i,2}=1$, coeff(i)=1.3.

Next, in S703, the CPU 105 sorts the degrees of reliability in descending order for each block, and extracts a particular number of motion vectors with high degrees of reliability. In the present embodiment, an image with 1920×1088 pixels are divided into blocks each having 16×16 pixels, and the motion search is performed on the image. Since the image is divided into 20 blocks, 408 motion vectors are detected per block. In the present embodiment, the top 25% of motion vectors, that is, 101 motion vectors are extracted. After S703, the CPU 105 advances the process to S304.

Figure 8:
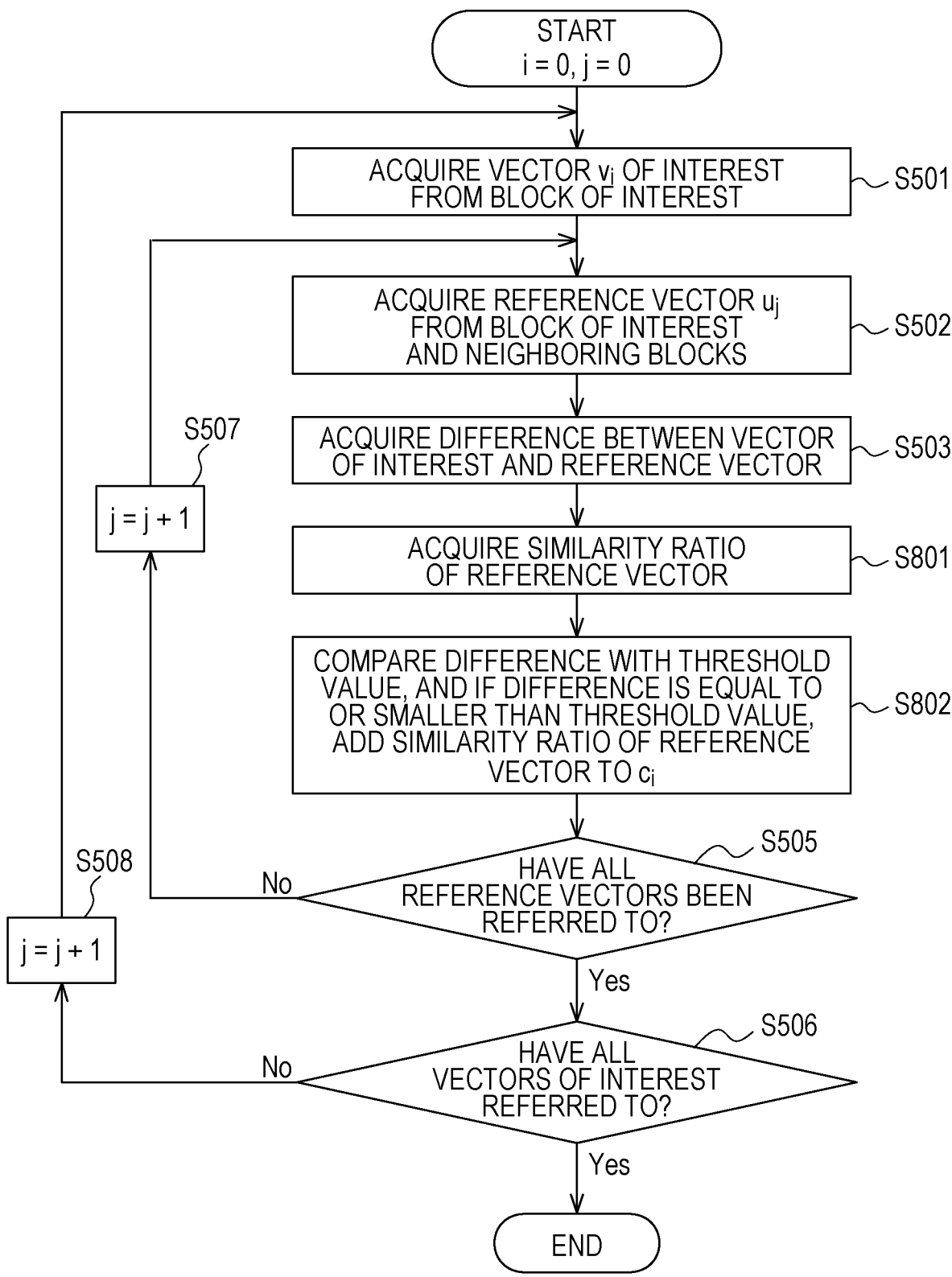
FIG. 8 is a flowchart of a process of calculating a degree of reliability according to the second embodiment.

FIG. 8 is a flowchart illustrating a flow of a reliability calculation process according to the second embodiment. The process shown in the flowchart in FIG. 8 is similar to that described above with reference to the flowchart shown in FIG. 5 except that the CPU 105 executes a process in S801 after S503, and performs a process in S802 instead of the process in S504. In S801, the CPU 105 acquires the similarity ratio coeff(j) described above. Thereafter, in S802, the CPU 105 compares the difference acquired in S503 with a threshold value. In a case where the difference is equal to or smaller than the threshold value, the CPU 105 adds the similarity ratio coeff(j) to the variable $c_i$.

Here, the higher the degree of image similarity, the closer to 0 the SAD value is. Therefore, when an area of the image includes a small number of features, the SAD has a value close to 0 in the search in this area. In this situation, the closer to 1 the ratio of similarity (coeff(i)) between the highest degree of similarity and the second highest degree of similarity is, the lower the degree of reliability, while the greater the ratio is with reference to 1, the higher the degree of reliability. In view of the above, the CPU 105 applies the ratios of similarity as weights to equation (14), and determines the weighted sum thereby obtaining a more accurate degree of reliability. In particular, when number of similar vectors existing in the surroundings is small, if the ratio of similarity is large, the degree of reliability is calculated as being high, and it becomes difficult to exclude abnormal motions.

The present embodiment has been described, by way of example, for the case where the motion search by the block matching is performed using SAD. However, this is merely an example. For example, SSD may be used instead of SAD. Alternatively, in the embodiment, the feature values of the feature points may be calculated and matching between the feature values may be determined. In that case, $dist_{i,1}$ and $dist_{i,2}$ are distances in the feature space. In the present embodiment, the ratio is used in the calculation of coeff(i). However, coeff(i) is not limited to being expressed in ratio. For example, coeff(i) may be expressed in difference as shown in equation (17). That is, coeff(i) may be given by a difference between a motion vector having a highest degree of similarity in motion and a motion vector having a next highest degree of similarity in motion.

$$coeff(i) = k(dist_{i,2} - dist_{i,1}) + \text{offset} \qquad (17)$$

Here, since the block size used in the SAD calculation is 16×16, k is set such that k=1/256. Offset is set to 10. The second embodiment has been described above, by way of example, for the case where $Y''_d = Y'_d$ as described above in S302 according to the first embodiment. However, $Y''_d$ is not limited to be given as $Y''_d = Y'_d$. For example, $Y''_d$ may be given as $Y''_d = Y_d$.

Third Embodiment

Figure 9:
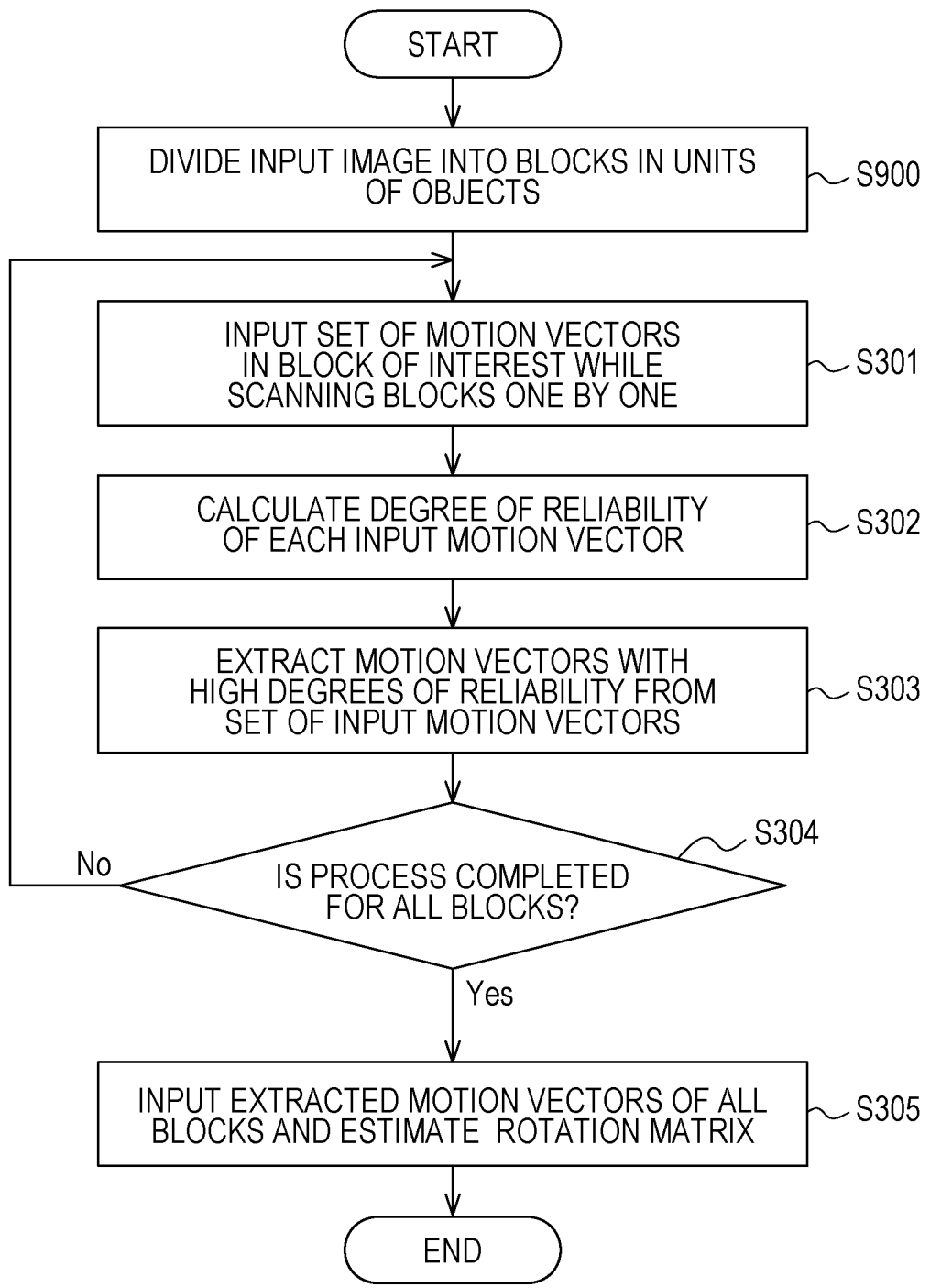
FIG. 9 is a flowchart of a process of estimating a transformation matrix according to a third embodiment.
Figure 10:
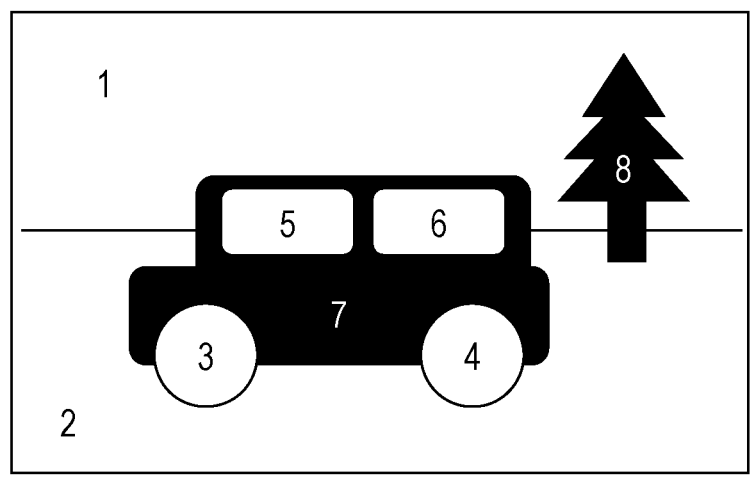
FIG. 10 is a diagram illustrating an example of a manner of dividing an image into blocks in units of objects, and an example of a manner of assigning block numbers.

A third embodiment is described below. In the third embodiment, a rotation matrix is estimated using intelligent blocks, and an electronic shake correction process is performed using the estimated rotation matrix. FIG. 9 is a flowchart illustrating a flow of a process of estimating a transformation matrix using blocks obtained by dividing an image in units of objects. The flowchart in FIG. 9 is similar to the flowchart shown in FIG. 3 except that it includes an additional process in S900. In S900, the CPU 105 divides the input image into blocks in units of objects. There are various methods for dividing the input image. In the present embodiment, by way of example, a k-mean method is used. In an example according to the present embodiment, the input image is divided into 8 blocks, and each block is assigned a block number. The order of assigning the object-based blocks the block numbers is arbitrary. The algorithm of dividing the input image and the number of divided blocks are not limited to those employed in the example, and the input image may be divided by other algorithms into other numbers of blocks. FIG. 10 illustrates an example of a result obtained by dividing an image. In this example shown in FIG. 10, the image is divided into blocks in units of objects, and block numbers are assigned to the object-based blocks. Note that the manner of assigning the block numbers is arbitrary.

After S900, the CPU 105 advances the process to S301. Processes following S301 are similar to those according to the first embodiment described above. However, in the third embodiment, unlike the first embodiment in which the image is divided into blocks in the form of a grid, the image is divided into blocks with arbitrary shapes in units of objects. In the third embodiment, the above-described threshold value th is determined by the density of motion vectors (the number of motion vectors/pixel) and the area size (the number of pixels) of the block. For example, in a case where the density of motion vectors is one per area including 16 pixels in the vertical direction and 16 pixels in the horizontal direction, the block size is 10000 pixels, and the coefficient k is 0.1, then th=k×1/256×10000≅4.

In the third embodiment, e is set to 3 when the target subject is a soft object such as an animal or a person, while e is set to 1 when the target subject is a rigid object such as a car, a building, or the ground. Since the probability is high that motion vectors belonging to the same object have same vector components, if the degree of reliability is calculated from motion vectors included in the same object, then vectors with low degrees of reliability can be excluded, and thus an increase in the inlier rate can be achieved. Therefore, in the rotation matrix estimation, among sets of motion vectors in objects wherein motion vectors are similar to each other in each object, motion vectors included in a set of vectors belonging to an object which is the largest in area tend to determine the main components of the overall motion of the image. This means that when the shake correction is performed using the estimated rotation matrix, the shake correction is most effective for the large area of the image, which results in an increase in stability of the shake correction. In the present embodiment, since subjects and motion vectors are associated with each other, vectors extracted according to degrees of reliability can be used not only for the rotation matrix estimation for the purpose of shake correction but also for the purpose of tracking the subject.

The features of the embodiments may also be achieved by providing to a system or an apparatus a storage medium having software program code stored therein for implementing the functions disclosed in the embodiments described above and by reading and executing the program code on a computer (or a CPU or an MPU) disposed in the system or the apparatus. The present disclosure may also be realized by a circuit (such as an ASIC) configured to realize one or more functions described above. The above embodiments are merely illustrative examples of implementations of the present disclosure, and it is to be understood that the technical scope of the present disclosure is not limited to these embodiments. That is, the present disclosure can be implemented in various forms without departing from the technical scope and main features.

According to the disclosure, it is possible to obtain the degree of reliability of the motion vector, which has high precision and high accuracy.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-186713 filed Nov. 9, 2020, which is hereby incorporated by reference herein in its entirety.

What is claimed is:
1. An image processing apparatus comprising:
   one or more processors; and
   at least one memory, the at least one memory being coupled to the one or more processors and having stored thereon instructions executable by the one or more processors, wherein at least one of the one or more processors or execution of the instructions cause the image processing apparatus to function as:

a vector acquisition unit configured to acquire a plurality of motion vectors based on consecutive images;

a selection unit configured to select a motion vector of interest and a plurality of neighboring motion vectors neighboring the motion vector of interest from the acquired plurality of motion vectors;

a similarity acquisition unit configured to acquire a degree of similarity between two motion vectors; and a reliability acquisition unit configured to acquire a degree of reliability represented by a value related to a total number of neighboring motion vectors having high degrees of similarity to the motion vector of interest, wherein the similarity acquisition unit calculates, as the degree of similarity of motion, a norm of a difference between two motion vectors.

2. The image processing apparatus according to claim 1, wherein the selection unit selects the neighboring motion vectors by checking each block of blocks obtained by dividing the image to determine whether the block includes at least the motion vector of interest, and, when the block includes the motion vector of, selecting motion vectors included in the block other than the motion vector of interest as the neighboring motion vectors.

3. The image processing apparatus according to claim 1, wherein the at least one of the one or more processors or the execution of the instructions cause the image processing apparatus to further function as an information acquisition unit configured to acquire image similarity information corresponding to the motion vectors to be acquired, wherein the reliability acquisition unit calculates the degree of reliability based on the number of motion vectors having high degrees of similarity equal to or higher a threshold value in terms of the similarity of motions and the image similarity information.

4. The image processing apparatus according to claim 3, wherein the image similarity information indicates a ratio of an image similarity of a motion vector with a highest degree of similarity of motion to an image similarity of a motion vector with a next highest degree of similarity of motion.

5. The image processing apparatus according to claim 3, wherein the image similarity information indicates a difference between an image similarity of a motion vector with a highest degree of similarity of motion and an image similarity of a motion vector with a next highest degree of similarity of motion.

6. The image processing apparatus according to claim 1, wherein the reliability acquisition unit acquires the degree of reliability such that in a case where the norms between the neighboring motion vectors and the motion vector of interest are equal to or smaller than a threshold value, the reliability acquisition acquires, as the degree of reliability, a value related to the total number of neighboring motion vectors.

7. The image processing apparatus according to claim 6, wherein the threshold value for the norm changes depending on a subject whose motion is to be detected.

8. The image processing apparatus according to claim 1, wherein the at least one of the one or more processors or the execution of the instructions cause the image processing apparatus to further function as a parameter acquisition unit configured to acquire a motion parameter representing the motion of the image based on the motion vectors for which the degree of reliability is acquired.

9. The image processing apparatus according to claim 1, wherein the at least one of the one or more processors or the execution of the instructions cause the image processing apparatus to further function as a unit configured to perform at least one of an image shake correction, a free viewpoint generation, or an image composition, based on the motion parameter.

10. An image processing method comprising:
acquiring a plurality of motion vectors based on consecutive images;
selecting a motion vector of interest and a plurality of neighboring motion vectors neighboring the motion vector of interest from the acquired plurality of motion vectors;
acquiring a degree of similarity between two motion vectors; and
acquiring a degree of reliability represented by a value related to a total number of neighboring motion vectors having high degrees of similarity to the motion vector of interest,
wherein the similarity acquisition unit calculates, as the degree of similarity of motion, a norm of a difference between two motion vectors.

11. A non-transitory computer-readable storage medium storing instructions that, when executed by a computer, cause the computer to perform a method comprising:
acquiring a plurality of motion vectors based on consecutive images;
selecting a motion vector of interest and a plurality of neighboring motion vectors neighboring the motion vector of interest from the acquired plurality of motion vectors;
acquiring a degree of similarity between two motion vectors; and
acquiring a degree of reliability represented by a value related to a total number of neighboring motion vectors having high degrees of similarity to the motion vector of interest,
wherein the similarity acquisition unit calculates, as the degree of similarity of motion, a norm of a difference between two motion vectors.

* * * * *